Sept. 4, 1956 F. L. WASSELL 2,761,452

MULTIPLE CARD SUPPORT AND PARTITION MEMBER FOR FILES

Filed May 11, 1951 2 Sheets-Sheet 1

INVENTOR.
FRANK LLOYD WASSELL
BY
Campbell, Brumbaugh, Free & Graves
ATTORNEYS

Sept. 4, 1956 F. L. WASSELL 2,761,452

MULTIPLE CARD SUPPORT AND PARTITION MEMBER FOR FILES

Filed May 11, 1951 2 Sheets-Sheet 2

INVENTOR.
FRANK LLOYD WASSELL
BY
Campbell, Brumbaugh, Free & Graves
ATTORNEYS

United States Patent Office 2,761,452

Patented Sept. 4, 1956

2,761,452

MULTIPLE CARD SUPPORT AND PARTITION MEMBER FOR FILES

Frank Lloyd Wassell, Westport, Conn., assignor to Georgene Parkin Wassell, Westport, Conn.

Application May 11, 1951, Serial No. 225,872

2 Claims. (Cl. 129—16)

The present invention relates to visible card files and, more particularly, to multiple card supports adapted for vertical storage around the circumference of a rotary tray file and to the card separators associated with said supports.

There is an increasing employment of business machine or tabulating cards in reference or information files. It is necessary in such files to refer to individual cards rather than to groups of cards. Frequently, as when the cards are identified by name rather than by number, it is extremely helpful to arrange the cards in a visible file with the index line on each card in view. Heretofore, it has been customary to provide card separators attached to flat file drawers. Such file drawers require pulling out and pushing in and involve bending, stretching and even walking on the part of the file clerk, if a large number of cards is under the care of a single clerk. Rotary tray files have been developed which make available to a seated operator a large quantity of vertically filed material and avoid the disadvantages of drawer files.

It is, accordingly, a primary object of the invention to provide multiple card supports which adapt rotary tray files to visible file use.

Another object of the invention is to provide a multiple card support having such construction as to protect the file cards, to insure proper alignment of the cards, and to permit ready removal and reinsertion of the same.

A further object is to provide an improved card support and associated card separators so shaped that a plurality of supports may be neatly stacked around the circumference of a rotary tray file.

The novel features which achieve these objects will now be described in detail with reference to the accompanying drawings wherein.

Figures 1, 2, 3:
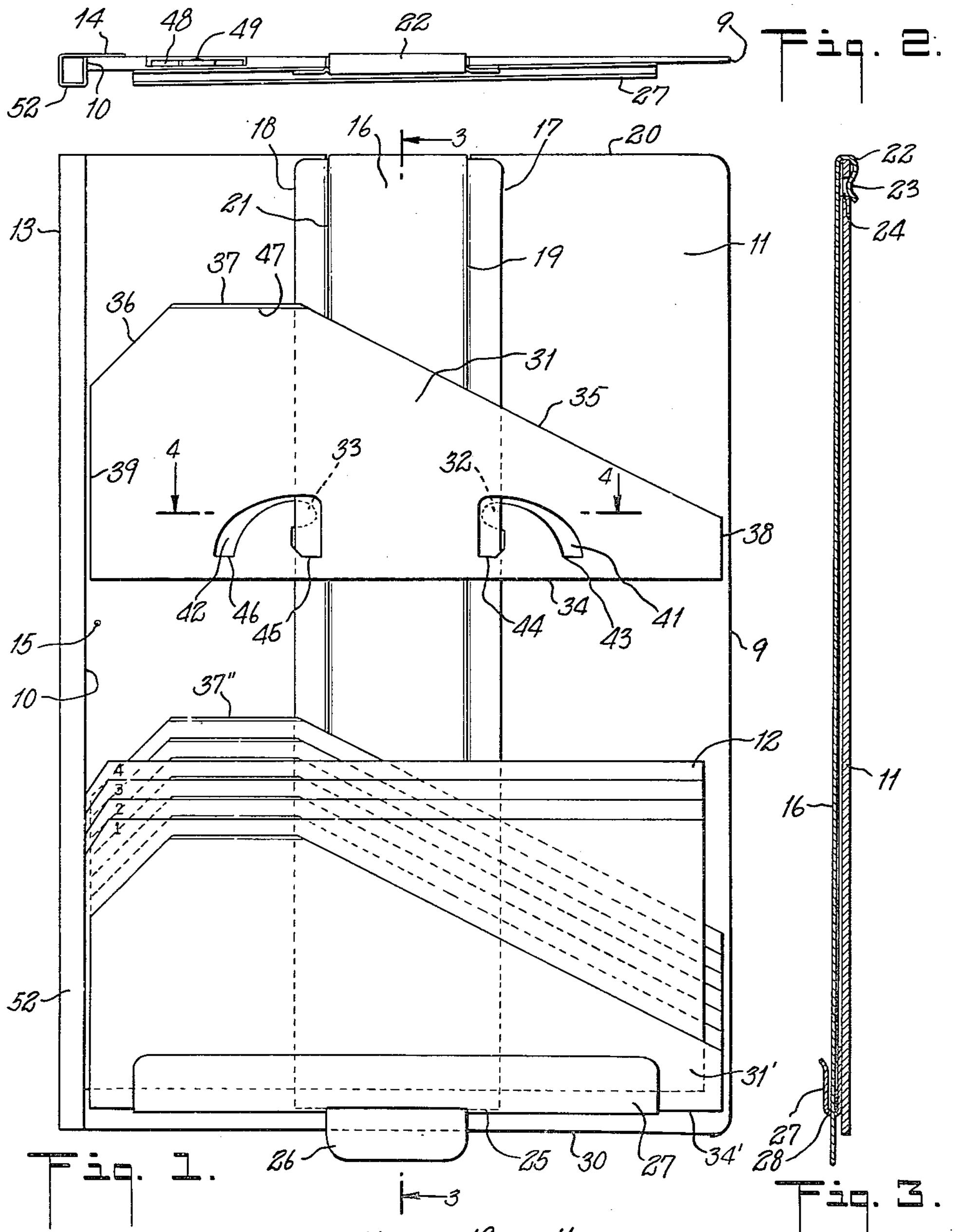
Figure 1 is a view of the front of a multiple card support showing some card separators in operative position on a mounting strip in front of a back plate and one separator positioned apart from the rest for purposes of illustration.
Figure 2 is a view of the top end of the card support shown in Figure 1.
Figure 3 is a view of a longitudinal section of the multiple card support taken along line 3,3 of Figure 1, showing how the mounting strip is removably attached to the back plate.
Figure 4:
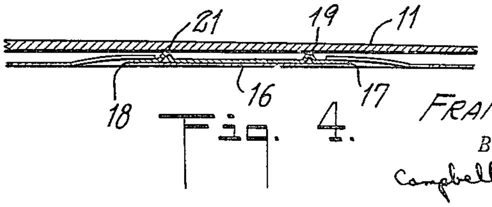
Figure 4 is a view of a transverse section of the multiple card support taken along line 4,4 of Figure 1, showing in detail how the tongues on the card separators slip between the mounting strip and the back plate.
Figure 5:
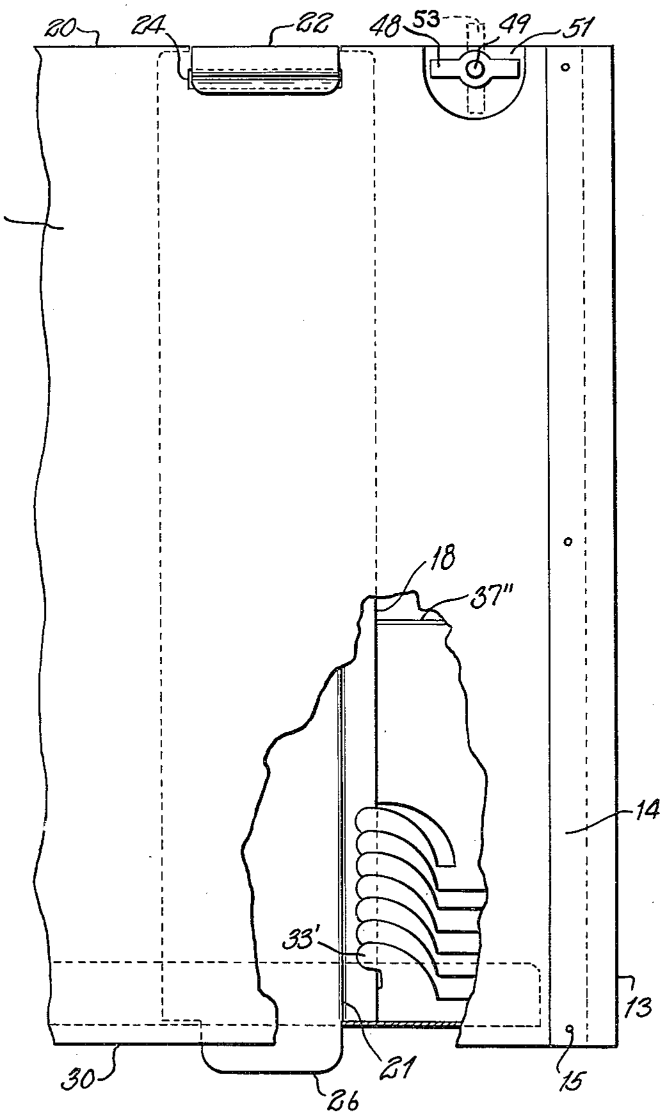
Figure 5 is a view of the rear of the multiple card support with a portion of the back plate broken away to reveal the manner in which the tongues on the card separators overlap.

Referring now to Figs. 1 to 5, a multiple card support is shown having a back portion or plate 11 against the face of which a plurality of cards 12 are arranged to be removably filed in stepped or echelon order with an index line on each card visible. Plate 11 has a width between inside edge 9 and outside edge 10 at least as great as the transverse dimension of file cards 12.

A longitudinal edge reinforcing portion or rib 13 extends along the outside edge 10 and projects above the surface of plate 11. Rib 13 is formed from a strip of metal which is successively bent at right angles upon itself about three parallel spaced lines to produce a hollow tube of substantially rectangular cross-section. The rear of rib 13 has an extension strip 14 which overlaps plate 11 and is fastened thereto by means of rivets 15.

A metal mounting strip 16 is detachably secured to the middle portion of the face of plate 11 and is provided with edges 17, 18 substantially parallel with rib 13. Strip 16 has grooves 19 and 21 stamped therein to form reinforcing ridges on the underside thereof which serve to space edges 17 and 18 from plate 11. The top of strip 16 is bent backwards in the shape of a spring clip 22 having a re-entrant portion 23 near the end thereof. In operative position the strip 16 clips over top edge 20 of plate 11 and the re-entrant portion 23 snaps into a transverse groove or slot 24 in the rear of the plate 11. The lower end of strip 16 abruptly reduces in width, leaving shoulders 25, and extends in the form of a tongue 26 beyond bottom edge 30 of the plate 11. Tongue 26 is insertable in a radially-aligned slot in the surface of a rotary tray file and serves to hold the multiple card support in vertical position in an annular stack of similar card supports.

A transverse edge reinforcing portion or retaining member 27 is provided adjacent bottom edge 30 extending most of the width of plate 11. The retaining member 27 is shaped like a clip or open-ended pocket and has a slot 28 in its bottom through which tongue 26 projects. Member 27 is fastened, as by riveting, to plate 11 with the result that the lower end of strip 16 is held securely.

A plurality of flexible file card separators 31 are provided each having tongues 32 and 33 formed therein near the bottom edge 34 thereof. Tongues 32 and 33 are insertable behind edges 17 and 18, respectively, of the strip 16 to hold separators 31 substantially flat against plate 11 in overlapping relation, extending from retaining member 27 to the top edge 20.

The separators 31 have an irregular hexagonal shape formed from a rectangle having a length and breadth slightly larger than the cards which they are intended to separate. The upper corners are cut away leaving diagonal edges 35 and 36 of unequal slope and length. Diagonal edge 35 connects top edge 37 to inside edge 38 with a slope substantially less and a length substantially greater than the slope and length of diagonal edge 36 that connects top edge 37 to outside edge 39. Accordingly, inside edge 38 is substantially shorter than outside edge 39. The difference in the lengths of the edges 38 and 39 causes the inside edge 38 of a particular separator 31 to overlap substantially fewer separators than are overlapped by a particular outside edge 39. This difference in number gives rise to a difference in the thickness of the stacked separators as measured at the edges 9 and 10 of the plate 11 and perpendicularly to the face thereof. This produces a noticeable tapering toward edge 9 which permits the multiple card support to fit about the periphery of a rotary tray file more conveniently. Preferably, for the same purpose plate 11 likewise tapers in thickness from outside edge 10 to inside edge 9, as shown in Fig. 2.

Tongues 32 and 33 are formed integrally within the card separators 31 by cutting away irregular-shaped portions 41 and 42 of the separator leaving edges 43, 44 and 45, 46 which lie in a common line parallel to the bottom edge 34 of the separator. Tongues 32 and 33 are mirror images of each other, rising from edges 43, 44 and 45, 46, respectively, and curving toward each other. When the separators are in operative or meshed position the bottom edge 34 of one separator 31 rests on edges 43, 44 and 45, 46 of the next preceding overlapping separator. The overlapped separator serves in turn to give longitudinal support to the next succeeding underlapping separator. Thus a tongue of a separator, as viewed in Fig. 5 from the rear of plate 11, lies on top of the corresponding tongue of the next succeeding separator in ascending order.

The edge 34' of the lowermost separator 31' rests on the bottom of retaining member 27 which serves to restrain the separator against movement downward and away from plate 11.

A card 12 may be slipped between adjacent card separators 31 and supported on the same edges 43, 44 and 45, 46 as support the separator lying immediately behind the card. In order to facilitate filing the cards, a crease 47 is formed parallel and immediately below the top edge 37 of each separator 31. Crease 47 causes top edge 37 to turn out slightly so that the lower left-hand corner of card 12 may readily be inserted behind any separator.

Card separators 31 are preferably made from stiff paper having a different color from that of the file cards in order to aid in the replacement of the cards and to show the absence of a file card by a revealing gap in the bank of cards. When the separators 31 are in meshed relationship and the file cards are housed therebetween, each separator extends a fraction of an inch above the card directly in front of the same. The card may be extracted by slipping a fingernail behind the card, pressing against the stack and grasping the portion of the card near rib 13 where the separators have been cut away diagonally along edges 36.

A rotatable tab or indicator 48 pivoting about a rivet 49 may be conveniently located in a recess on the rear of plate 11 in the upper outside corner thereof. When a card is removed from the card support, indicator 48 is turned by the file clerk to its signalling position 53, shown by dashed lines in Fig. 5.

In a particular embodiment of the multiple card support, the separators 31 were perhaps ⅛ inch longer than the file cards 12. Approximately 30 cards were adapted to be held on plate 11, with 13 cards overlapping at any one point. The ratio of the length of the inside edges 38 to the outside edges 39 was about one to three. Top edges 37 extended approximately 1/32 of an inch above the file card in front of each separator, leaving roughly ¼ of an inch of the top of each card visible.

Rib 13 provides longitudinal rigidity for the card support and extends a sufficient distance above the surface of plate 11 so that contact with an adjacent card support is primarily made against face 52 of the rib, and thus the cards and card separators are protected from damage. Rib 13 also aids in maintaining alignment of the file cards and prevents downward rotation of the top outside corners of these cards.

Mounting strip 16 is preferably of metal to provide additional rigidity, but has been constructed of fiber permanently fixed to plate 11. In this case the middle portion of strip 16 lies flat against plate 11 and edges 17 and 18 are offset above the surface of plate 11. When the mounting strip is removable from plate 11, as shown in the drawings, the separators may be conveniently mounted by first placing them in overlapping relation and then advancing the strip 16 under the tongues from the top of the stack of separators to the bottom. In this manner each tongue tends to bend the next succeeding tongue away from its separator and thus facilitates entry of the mounting strip 16.

Plate 11 may for reasons of economy be flat rather than tapered in thickness and if made of metal may be integral with rib 13, retaining member 27 and tongue 26 which can be cut and bent from a single sheet.

It is therefore to be understood that the multiple card support may differ substantially from the form shown in the drawings, and accordingly the claims are not to be interpreted in the light of that particular embodiment of the invention which has been disclosed in detail.

I claim:

1. A multiple card support adapted to be stored in an upright position in a rotatable file tray substantially parallel to a radius of the tray comprising, a back plate having a thickness tapering toward the inner edge thereof, means for securing a plurality of card separators in overlapping position to said plate, a plurality of card separators secured to said plate in overlapping position by said means, said card separators being in the form of upright polygonal flexible sheets having outer and inner overlapping edges substantially parallel with the corresponding edges of said plate for holding file cards against the surface of said plate with an index line on each card visible, the height of each separator along the inner edge being substantially less than the height at the outer edge whereby each separator overlaps fewer separators along the inside edge than along the outside edge, and a vertical member extending along the outer edge of said plate and projecting above the surface thereof to protect the file cards.

2. A multiple card support adapted to be stored in an upright position in a rotatable file tray substantially parallel to a radius of the tray comprising, a back plate, a detachable mounting strip attached to said plate, a plurality of card separators mounted on said strip in overlapping relation, said card separators being in the form of upright polygonal flexible sheets having outer and inner overlapping edges substantially parallel with the corresponding edges of said plate, the height of each separator along the inner edge being substantially less than the height at the outer edge whereby each separator overlaps fewer separators along the inside edge than along the outside edge, retaining member adjacent the bottom of said back plate and having a slot therein, the top end of said mounting strip being formed as a clip to engage the top edge of said back plate and the bottom end of said strip projecting as a tongue through said slot.

References Cited in the file of this patent

UNITED STATES PATENTS

| | | |
|---|---|---|
| 877,600 | Sawyer | Jan. 28, 1908 |
| 1,008,352 | Meyers | Nov. 14, 1911 |
| 1,048,058 | Fisher | Dec. 24, 1912 |
| 1,297,522 | Wirt | May 18, 1919 |
| 1,421,670 | Campbell | July 4, 1922 |
| 1,440,119 | Wernery | Dec. 26, 1922 |
| 1,563,158 | Campbell et al. | Nov. 24, 1925 |
| 1,586,331 | Salomen | May 25, 1926 |
| 1,654,545 | Lindsay | Jan. 3, 1928 |
| 1,725,855 | Day | Aug. 27, 1929 |
| 1,780,006 | Day | Oct. 28, 1930 |
| 1,820,889 | Sibley | Aug. 25, 1931 |
| 2,124,904 | Brainard | July 26, 1938 |
| 2,195,943 | Straubel | Apr. 2, 1940 |
| 2,198,183 | Soderlund | Apr. 23, 1940 |
| 2,384,355 | Torrence et al. | Sept. 4, 1945 |

FOREIGN PATENTS

| | | |
|---|---|---|
| 462,591 | Germany | 1928 |